(12) United States Patent
Ramirez et al.

(10) Patent No.: US 12,456,097 B2
(45) Date of Patent: Oct. 28, 2025

(54) USE OF A SINGLE SKU FOR PRODUCT THROUGHOUT LIFE CYCLE

(71) Applicant: DISH Wireless L.L.C., Littleton, CO (US)

(72) Inventors: James Ramirez, Littleton, CO (US); Laurel Dumonteil, Centennial, CO (US); Christopher George, Lees Summit, MO (US)

(73) Assignee: DISH Wireless L.L.C., Littleton, CO (US)

( * ) Notice: Subject to any disclaimer, the term of this patent is extended or adjusted under 35 U.S.C. 154(b) by 378 days.

(21) Appl. No.: 18/145,742

(22) Filed: Dec. 22, 2022

(65) Prior Publication Data

US 2024/0211871 A1    Jun. 27, 2024

(51) Int. Cl.
*G06Q 10/087* (2023.01)
*G06Q 10/10* (2023.01)

(52) U.S. Cl.
CPC ................... *G06Q 10/087* (2013.01)

(58) Field of Classification Search
CPC .................................................. G06Q 10/087
USPC ........................................................... 705/28
See application file for complete search history.

(56) References Cited

U.S. PATENT DOCUMENTS

| | | | |
|---|---|---|---|
| 2015/0032502 A1* | 1/2015 | Green | G06Q 20/203 |
| | | | 705/7.29 |
| 2020/0012983 A1* | 1/2020 | Wicker | G06Q 10/06315 |
| 2024/0104495 A1* | 3/2024 | Philip | G06Q 10/087 |

* cited by examiner

*Primary Examiner* — Garcia Ade
(74) *Attorney, Agent, or Firm* — Kilpatrick Townsend & Stockton LLP

(57) ABSTRACT

A method for tracing an inventory item from an inventory is provided. In one example, the method includes: obtaining a single SKU and assigning the single SKU to an inventory item of an inventory; generating a single SKU profile for the inventory item according to the single SKU and storing the single SKU profile in an inventory SKU data model, the single SKU profile including a number of the single SKU and an inventory location of the single SKU; generating an inventory record according to the single SKU and storing the inventory record in the inventory SKU data model; identifying the inventory item according to the number and location of the single SKU, based on an instruction for order fulfillment; and tracking the inventory item according to the single SKU to determine an inventory status change thereof and recording the inventory status change in the inventory record.

20 Claims, 9 Drawing Sheets

USE OF A SINGLE SKU FOR PRODUCT THROUGHOUT LIFE CYCLE

BACKGROUND OF THE INVENTION

The present disclosure relates generally to inventory management, and more particularly systems and methods for tracking an inventory item and monitoring a status of an inventory item.

In a product distribution environment, particularly in the telecommunications industry, it is common for a company to track the movement and status of inventory for the subscriber equipment and service it provides. For effective inventory management, a company generally must have the ability to collect inventory information for each subscriber equipment item (e.g., a wireless mobile device), review the current state of an item, issue and track the status of purchase orders and work orders, monitor production and distribution, and provide stock adjustments. The accuracy and availability of such inventory information are vital as carriers, customers, operations, and various functions of the company typically rely on such information for reporting purposes, as well as to make important short-term and long-term business decisions.

Further, the company needs to track the subscriber equipment item in its life cycle to obtain a status of the inventory item, before and after the item leaves the inventory. The status of the inventory item may provide the company with abundant information regarding various aspects of the inventory item, which are useful to the company for improving customer service, marketing, inventory control, and other aspects of business operation.

BRIEF SUMMARY OF THE INVENTION

In some embodiments, a computer-implemented method for managing an inventory item, in particular, a device from an inventory is provided. In one example, the method includes: obtaining a single SKU and assigning the single SKU to an inventory item of an inventory; generating a single SKU profile for the inventory item according to the single SKU and storing the single SKU profile in an inventory SKU data model, the single SKU profile including a number of the single SKU and an inventory location of the single SKU; generating an inventory record according to the single SKU and storing the inventory record in the inventory SKU data model; identifying the inventory item according to the number and location of the single SKU, based on an instruction for order fulfillment; and tracking the inventory item according to the single SKU to determine an inventory status change thereof and recording the inventory status change in the inventory record.

In some embodiments, a system for managing an inventory item, in particular, a device from an inventory is provided. In one example, the system includes: one or more electronic processors; a machine-readable storage medium in electronic communication with the one or more electronic processors; and instructions stored in the machine-readable storage medium and executable by the one or more electronic processors to cause the system to: obtain a single SKU and assigning the single SKU to an inventory item of an inventory; generate a single SKU profile for the inventory item according to the single SKU and storing the single SKU profile in an inventory SKU data model, the single SKU profile including a number of the single SKU and an inventory location of the single SKU; generate an inventory record according to the single SKU and storing the inventory record in the inventory SKU data model; identify the inventory item according to the number and location of the single SKU, based on an instruction for order fulfillment; and track the inventory item according to the single SKU to determine an inventory status change thereof and recording the inventory status change in the inventory record.

In some embodiments, a computer program product for managing an inventory item, in particular, a device from an inventory is provided. In one example, the computer program product includes a non-transitory machine-readable storage medium encoded with instructions, the instructions executable to cause one or more processors of a computerized inventory management system to perform one or more operations of a method, the method comprising: obtaining a single SKU and assigning the single SKU to an inventory item of an inventory; generating a single SKU profile for the inventory item according to the single SKU and storing the single SKU profile in an inventory SKU data model, the single SKU profile including a number of the single SKU and an inventory location of the single SKU; generating an inventory record according to the single SKU and storing the inventory record in the inventory SKU data model; identifying the inventory item according to the number and location of the single SKU, based on an instruction for order fulfillment; and tracking the inventory item according to the single SKU to determine an inventory status change thereof and recording the inventory status change in the inventory record.

DETAILED DESCRIPTION OF THE INVENTION

Figure 1:
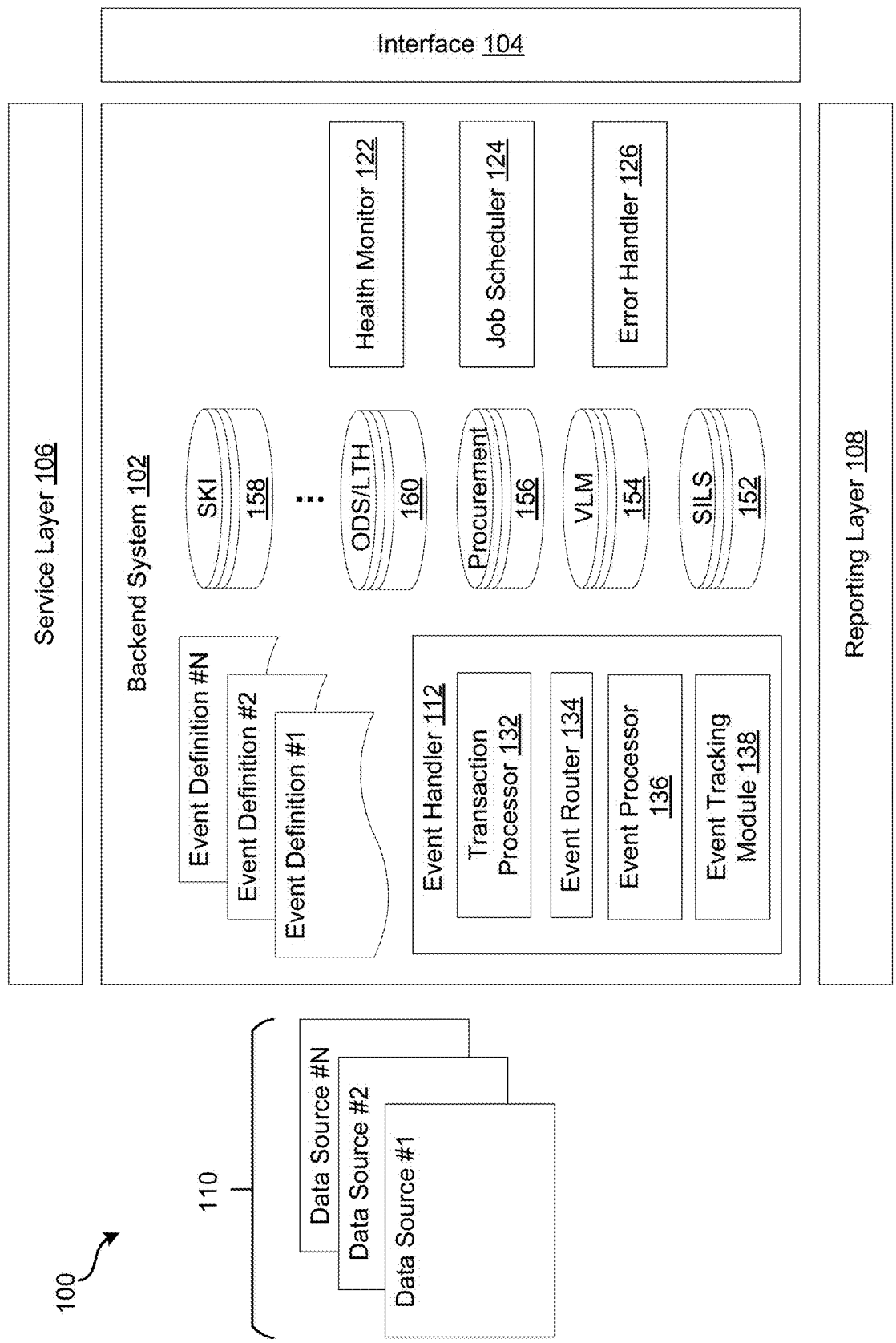
FIG. 1 is a schematic diagram illustrating an example system according to various embodiments.

As used herein, the term "mobile device" or "mobile communication device" refers to any one or all of cellular telephones, smartphones, personal or mobile multi-media players, personal data assistants, laptop computers, tablet computers, smart books, smart watches, palm-top computers, wireless electronic mail receivers, multimedia Internet-enabled cellular telephones, wireless gaming controllers, and similar personal electronic devices that include a UICC or eUICC, one or more SIM modules or eSIM modules, a programmable processor, memory, and circuitry for connecting to at least two mobile communication network with one or more shared radio frequency (RF) resources. Various examples may be useful in mobile communication devices, such as smartphones, and so such devices are referred to in the descriptions of various examples. However, the examples may be useful in any electronic devices that may individually maintain a plurality of subscriptions that utilize at least one shared RF chain, which may include one or more of antennae, radios, transceivers, etc.

As used herein, the terms "UICC," "SIM module," "SIM card," and "subscriber identification module" are used interchangeably to refer to a memory module that may be an integrated circuit embedded into a removable card having a physical form factor that stores an International Mobile Subscriber Identity (IMSI), related key, and/or other information used to identify and/or authenticate the mobile device on a network and enable a communication service with the network. All GSM, UMTS, and LTE network mobile phone users have a unique identification associated with them known as an IMSI. Because the information stored in a UICC or SIM enables the mobile communication device to establish a communication link for a particular communication service with a particular network, the term "subscription" is used herein as a shorthand reference to refer to the communication service associated with and enabled by the information stored in a particular UICC or SIM as the UICC or SIM and the communication network, as well as the services and subscriptions supported by that network, correlate to one another.

As used herein, the terms "eUICC," "eSIM module," "eSIM card," "embedded subscriber identification module," "iUICC,", "iSIM module,", "iSIM card,", and "integrated subscriber identification module" are used interchangeably to refer to a memory module that may be an integrated circuit embedded into or integrated with a mobile device that stores an International Mobile Subscriber Identity (IMSI), related key, and/or other information used to identify and/or authenticate the mobile device on a network and enable a communication service with the network. Unlike the traditional SIM card, the eSIM is usually treated as a programmable SIM or digital SIM that users to activate a cellular plan from a carrier without having to use a physical SIM card. An eSIM may use a software-based SIM embedded into an unremovable eUICC.

An eUICC is the equivalent of a SIM card that is implemented in memory and supports the downloading and installation of multiple mobile network operator profiles, or subscription profiles, in its secure domain. Thus, a single eUICC may support more than one subscription, unlike traditional SIM cards that each support one subscription at a time. Further, users may upload subscription identifying information to an eUICC to add a subscription instead of replacing a physical SIM card. The eUICC allows the eUICC provider to manage the profiles associated with the eUICC, such as enabling profiles, disabling profiles, deleting profiles, resetting the memory of the eUICC (e.g., to delete all profiles), querying the list of profiles, and renaming of profiles.

An eUICC also allows one profile to be enabled at any time. If a user wants to activate or enable another subscription profile, the active subscription is deactivated first by performing a detach procedure between the active subscription and its respective network, and then the new subscription is activated by performing an attach procedure with its respective network. Thus, while the eUICC may support more than one subscription, the subscriptions cannot be simultaneously active on the eUICC. During the detach and attach procedure for switching subscriptions the user may not be able to utilize any subscription, and thus may not place or receive calls. The detach and attach procedure for switching subscriptions may take a long time from the perspective of a user eager to place or receive a call.

In various embodiments, novel systems and methods for managing an inventory and tracking an inventory item thereof using a single SKU are provided. In particular, an inventory item such as a SIM, a device, or a kit including a SIM and a device can be assigned with a single SKU and tracked using the single SKU. The single SKU allows for precisely and conveniently monitoring and tracking the inventory item to obtain a status thereof (such as a location of the inventory item, an inventory status of the inventory item, and a live status of the inventory item when it becomes owned by a customer, etc.). In this way, the inventory item can be tracked throughout the life cycle of the device, before and after it leaves the inventory, and/or for multiple types of vendors. In addition, by using a single SKU, various aspects of the inventory item (e.g., both the device and the SIM/eSIM of a kit) can be monitored and tracked, eliminating the need to maintain separate SKUs for complex inventory items.

FIG. 1 is a schematic diagram illustrating an example system 100 configured to facilitate supply chain management, inventory management, and/or tracking an inventory item in accordance with one embodiment. In that embodiment, the system 100 is configured to manage a supply chain for a service/product provider, manage an inventory of products, establish and maintain an inventory database, and track an inventory item, in accordance with the present disclosure. In the illustrated example, the system 100 includes, among other components, a backend system 102, an interface layer 104, a service layer 106, a reporting layer 108, and data sources 110. In various implementations, the system 100 may include one or more electronic processors configured to implement various functions provided the components of system 100, such as those shown in FIGS. 2-7. It should be understood, the system 100 is not limited by its constituent components shown in this example. That is, it is not intended to limit the system 100 to one single computer device or more than one computer device. In accordance with the present disclosure, system 100 can be implemented by one or more computer device.

As shown in FIG. 1, the backend system 102 includes, among other components, an event handler 112, multiple databases, a health monitor module 122, a job scheduler 124, and an error handler 126. The multiple databases may include a serialized inventory live status (SILS) database 152, a virtual location management (VLM) database 154, a procurement database 156, a stock keeping unit information (SKI) database 158, an event history (transaction history) database 160. Other databases may also be included in the backend system 102. In addition, the databases included in the backend system 102 may be consolidated or integrated or otherwise share the same database platform.

The event handler 112 is configured to handle individual events received/generated by the backend system 102. A given individual event can indicate a creation/modification/retrieval of one or more data records managed by the backend system. In this example, the event handler 112 includes, among other components, a transaction processor 132, an event router 134, an event processor 136, an event tracking module 138.

In this example, the transaction processor is configured to process a transaction received as indicated by an event received by the event handler 112. For instance, a manual transaction of a new device activation may be entered through interface layer 104, which, in turn, generate an event of recording the device activation. This event is intercepted by the event handler 112 and a transaction of the new device is activation can be recorded in procurement database 156 through the transaction processor 132.

In this example, the event router 134 is configured to route an event received by the event handler 112 to an appropriate sub-module of the event handler 112 based on one or more definitions of the events. For instance, the event of the new device activation is routed to the event processor 136 for further processing, and an event of device tracking request is routed to the event track module 138 for further processing. As shown, individual definitions of the events can be stored in the backend system 102. A given definition of a particular event can specify one or more actions to be taken upon receiving this event by the event handler 112.

In this example, the event processor 136 is configured to process an event received by the event handler 112. For instance, the new device activation event request can be received by the event processor 136, which, in turn, is configured to instruct the transaction processor 132 to create a record in the procurement database 156 as a result of the new device activation event received by the event handler 112.

The event tracking module 138 is configured to track one or more events received by the event handler 112. For example, the events received by the event handler 112 can include an event inquiring a status of a particular device. After receiving this event, the event router 134 routes the event to the event tracking module, which, in turn, generates an inquiry into the VLM database 154 for a status for the particular device.

As can be seen, in this example, the backend system 102 includes various databases including a SILS database 152, a VLM database 154, a procurement database 156, a SKI database 158, an event history database 160, and/or any other databases. In this example, the SKI database 158 includes an inventory SKU data model configured to store a stock keeping unit (SKU) profile. The SKU profile contains a SKU number of an inventory item, a SKU location of the inventory item, and/or other information regarding various aspects of the inventory item. In some embodiments, each of the inventory items corresponds to a single SKU number, and the single SKU number is easily searchable, accessible, and identifiable. The single SKU number advantageously allows inventory managers to track a particular inventory item and identify the corresponding SKU location thereof. In addition, the single SKU number of the inventory item makes it convenient for inventory managers to track the inventory item and obtain a live status thereof. Details of the SKU profile will be discussed below with references to FIGS. 2-8.

Figure 2:
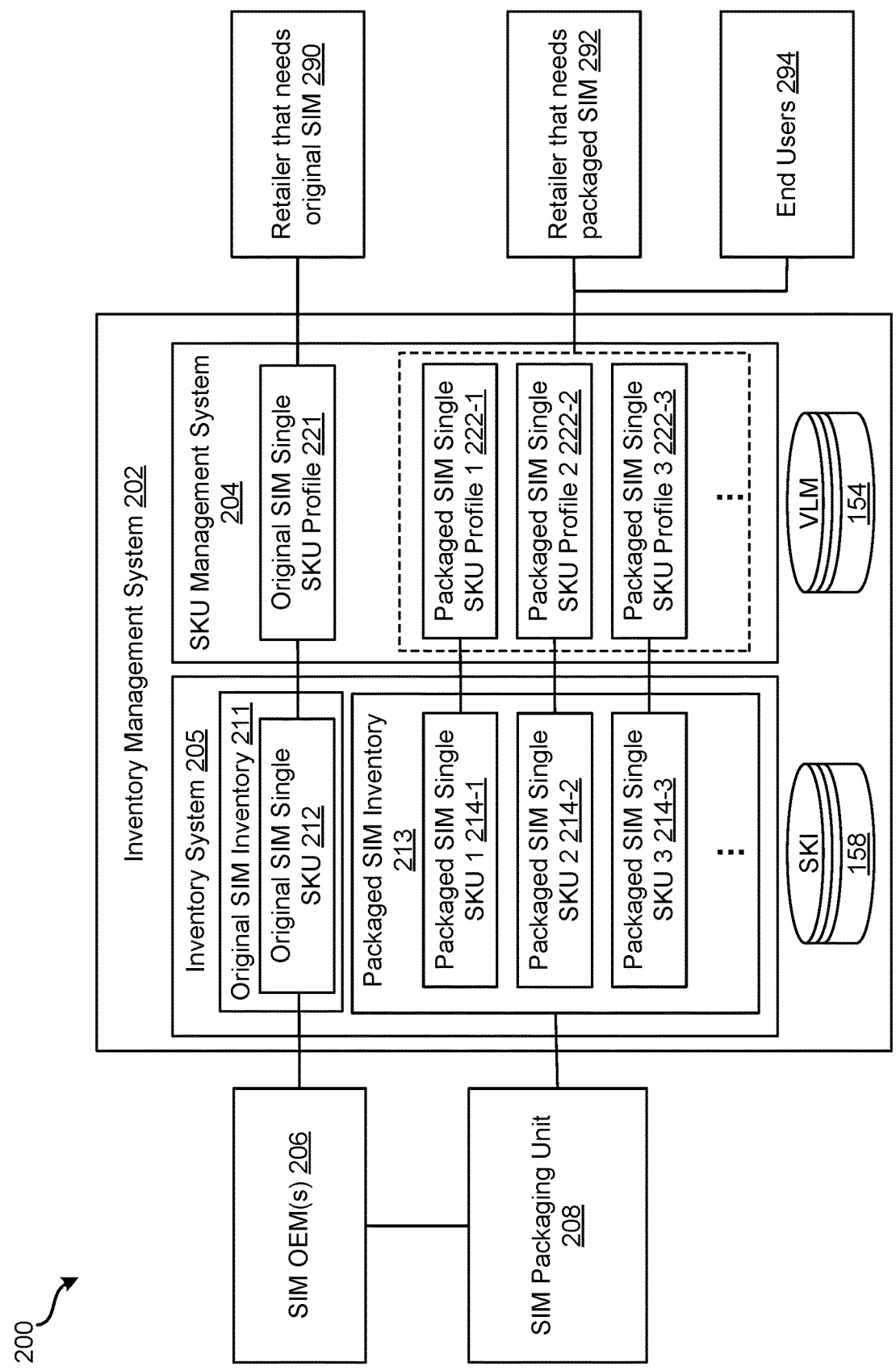
FIG. 2 is a schematic diagram illustrating an example of a supply chain management system according to various embodiments.

FIG. 2 is a schematic diagram illustrating an exemplary supply chain management system 200 in accordance with another embodiment. For brevity, several elements in FIG. 2 are represented as monolithic structures. It is to be understood, however, that each structure may include numerous interconnected computing elements and/or components designed to operate according to aspects of the present disclosure. The supply chain management system described herein may be operated by a product or service provider such as a company or enterprise.

In the illustrated example of FIG. 2, the supply chain management system 200 includes, among other components, an inventory management system 202 and a SIM packaging unit 208. The inventory management system 202 includes a SKU management system 204, an inventory system 205, a SKI database 158, and a VLM database 154. It is noted that additional components may be included in the inventory management system 202, such as the SILS database, the procurement database, and the ODS/LTH database shown in FIG. 1. The inventory system 205 includes at least one inventory containing an inventory item. In some embodiments, each individual inventory contains a particular type or a particular group of inventory items (e.g., the inventory item 512 shown in FIG. 5). In some embodiments, the inventory items from different inventories may be different from each other with respect to at least one attribute (e.g., product type, service type, carrier, etc.). The SKU management system 204 includes at least one single SKU profile corresponding to a specific inventory item of the inventory system. The single SKU profile includes a single SKU number and a single SKU location of the corresponding inventory item.

In some embodiments, the inventory item of the inventory system 205 is a subscriber equipment or subscriber device. An example of a subscriber device is a general-purpose computer capable of responding to and executing instructions in a defined manner. Other examples of a subscriber device include a special-purpose computer, a personal computer (PC), a workstation, a server, a laptop computer, a web-enabled telephone, a web-enabled personal digital assistant (PDA), a web-enabled personal computing device, a web-enabled smartphone, a SIM card (such as an original SIM card or a packaged SIM card), a kit including a device and a SIM compatible and operably connectable to the device, a device having a pre-inserted SIM card, or a device having one or more embedded SIM (eSIM) that is integrated with the device, etc.

In some embodiments, the inventory system 205 includes an original SIM inventory 211 and a packaged SIM inventory 213. The original SIM inventory 211 includes at least one original SIM single SKU 212 obtained from at least one SIM original equipment manufacturer (OEM) 206. The original SIM card is assigned with a single SKU (e.g., assigned by the SIM OEM) without additional packaging. The packaged SIM inventory 213 includes multiple packaged SIM cards 214 (e.g., 214-1, 214-2, 214-3, etc.). The packaged SIM cards 214 are obtained from the SIM packaging unit 208, where original SIM cards are packaged. The SIM packaging unit 208 may be an internal component of the supply chain management system 200 or alternatively an external facility operated by a third-party vendor. The packaged SIM cards 214 are each assigned with a single SKU (e.g., by the SIM OEM 206 or the SIM packaging unit 208). In addition, the packaged SIM cards may be branded under different brand names or service products, such that a single SKU (e.g., 214-1) corresponds to a specific brand or a specific service product. It is noted that the inventory system 205 may include only the original SIM inventory 211 in some embodiments or only the packaged SIM inventory 213 in alternative embodiments.

As mentioned above, the SKU management system 204 includes at least one single SKU profile corresponding to a specific inventory item of the inventory system. In some embodiments, the SKU management system 204 includes an original SIM single SKU profile 221 corresponding to the original SIM single SKU 212 of the original SIM inventory 211. The SKU management system 204 further includes a plurality of packaged SIM single SKU profiles (e.g., 222-1, 222-1, 222-3, etc.), respectively corresponding to the packaged SIM cards of the packaged SIM inventory 213 (e.g., the packaged SIM single SKU 1 214-1, the packaged SIM single SKU 2 214-2, the packaged SIM single SKU 3 214-3, etc.). The original SIM single SKU profile 221 may include a single SKU number and a single SKU location assigned to the original SIM single SKU 212. Likewise, each of the packaged SIM single SKU profiles may include a single SKU number and a single SKU location assigned to the packaged SIM card 214. The single SKU locations for each of the inventory items may be stored in the VLM database 154.

Upon receiving an event change notice for an inventory item, e.g., an order fulfillment request for a specific inventory item, the specific inventory item is located in the inventory system 205 identified according to the corresponding single SKU location of the SKU management system 204. The single SKU associated with the specific inventory item makes it convenient to locate, identify, and track the inventory item before and/or after the inventory item leaves the inventory system 205, and throughout the entire life cycle of the inventory item. Additional examples of the event change notice regarding an inventory item include a request for procurement, a purchase order (e.g., initiation of acquisition info), a purchase order acknowledgment (confirmation of the quality a particular vendor can fulfill), a supplier ship plan or schedule, a product registration request, a request for SLLS data structure, an advanced shipping notice, a dock appointment, a supplier invoice, a shipment receipt, a device-based transaction, a request for return/exchange, etc.

As an example, upon receiving an instruction to fulfill a purchase order for an original SIM single SKU 212 by a retailer 290 that needs an original SIM, the original SIM single SKU profile 221 corresponding to the original SIM single SKU 212 is accessed to identify the original SIM single SKU location in the inventory system 205, and the purchase order for the original SIM single SKU 212 is fulfilled. Similarly, purchase orders for packaged SIM single SKUs may be fulfilled by respectively accessing the packaged SIM single SKU profiles 222 and identifying the respective packaged SIM single SKU locations in the inventory system 205. As such, a single SKU for an inventory item is maintained as long as possible through the supply chain, and the overhead of needing to physically separate inventory items is reduced. In some embodiments, the inventory item can be directly delivered to end users 294 through business-to-customer transactions.

Figure 3A:
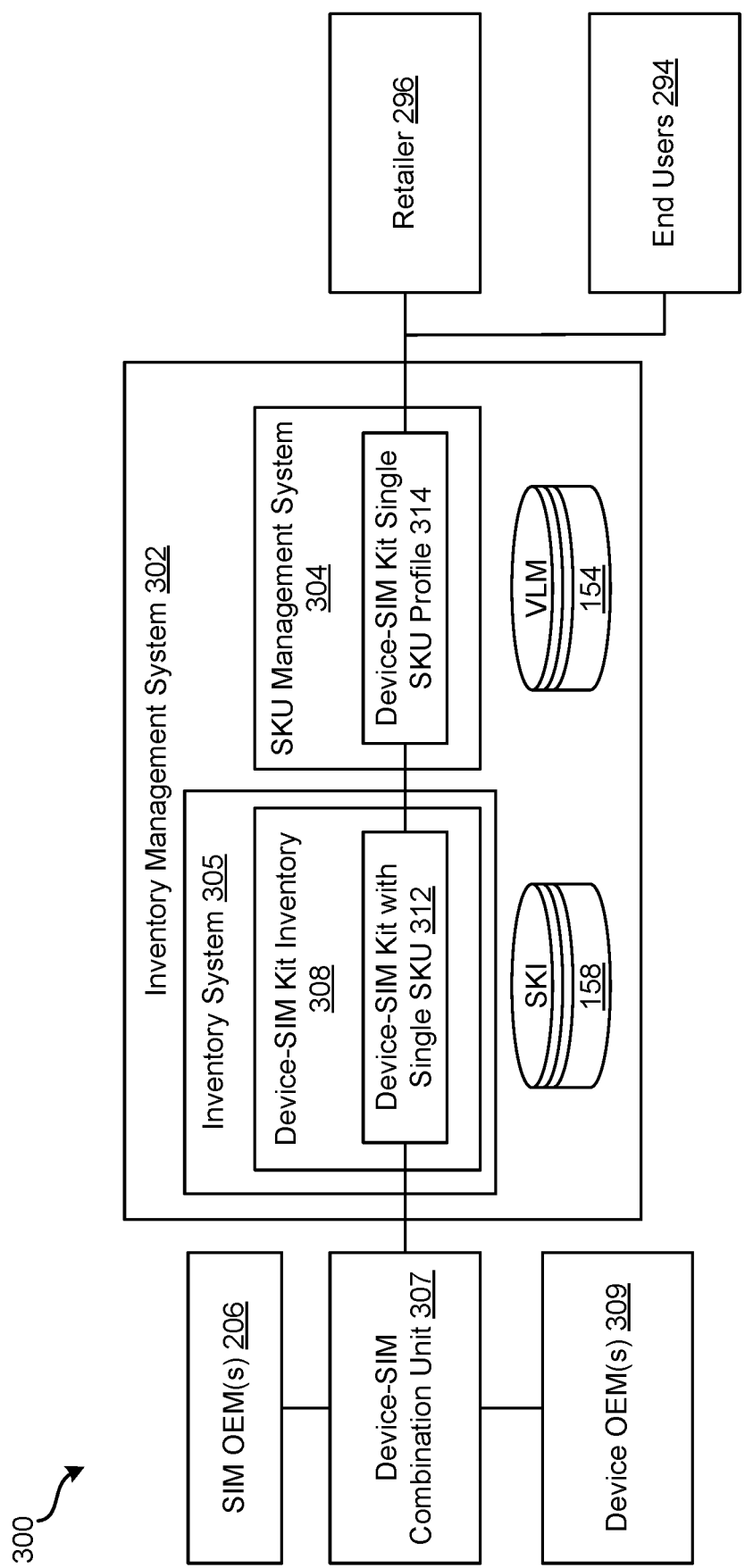
FIG. 3A is a schematic diagram illustrating another example of a supply chain management system according to various embodiments.
Figure 3B:
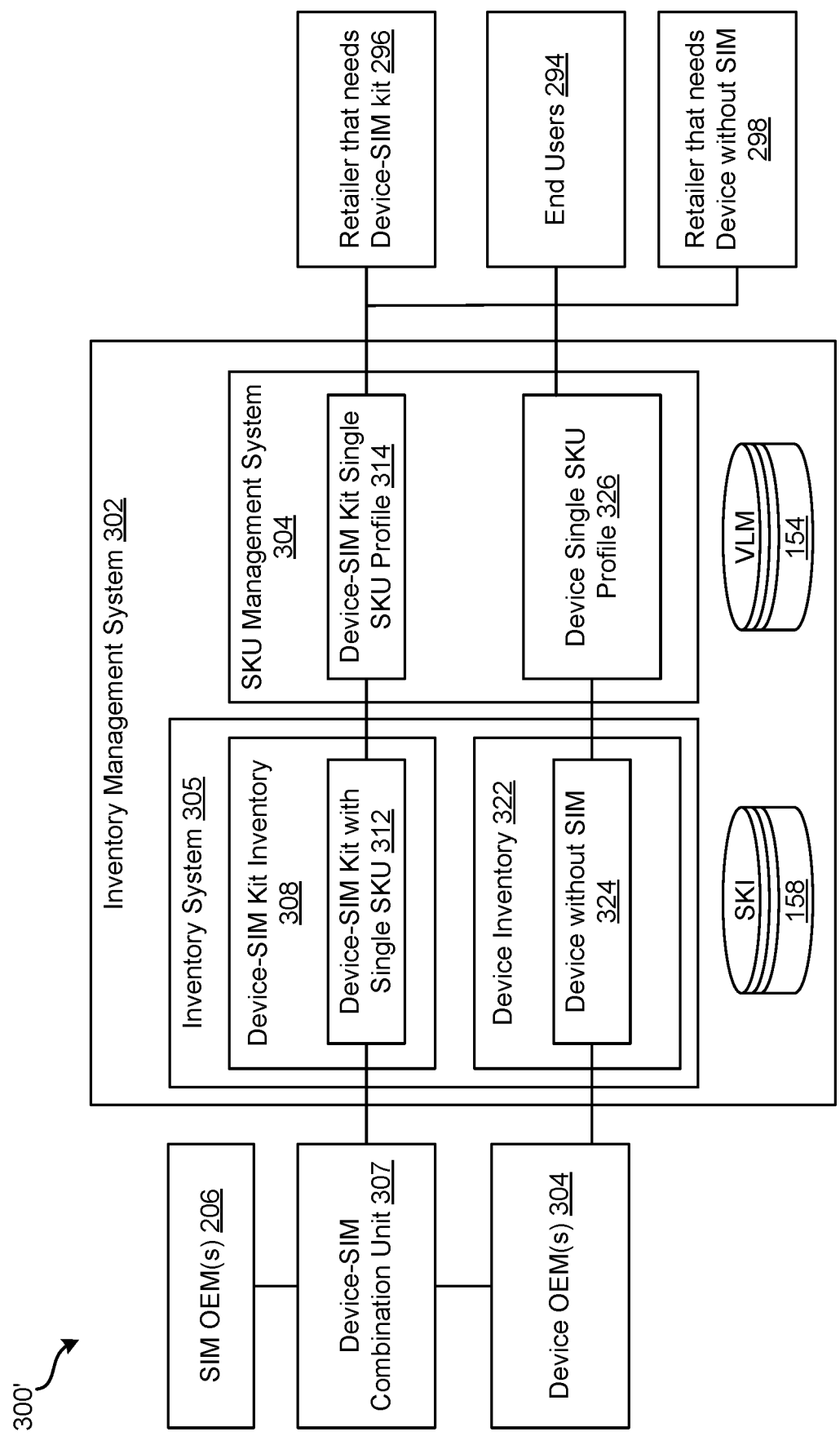
FIG. 3B is a schematic diagram illustrating yet another example of a supply chain management system according to various embodiments.

FIGS. 3A and 3B are schematic diagrams illustrating two exemplary supply chain management systems 300 and 300' in accordance with another embodiment. In the illustrated example of FIG. 3A, the supply chain management system 300 includes an inventory management system 302. The inventory management system 302 further includes an inventory system 305 and a SKU management system 304. The inventory system 305 includes a device-SIM kit inventory 308, which further includes at least one device-SIM kit 312. The device-SIM kit 312 includes a kit package having a device and a SIM compatible with and operably connectable to the device. The device may be obtained from a device OEM 309, and the SIM may be obtained from a SIM OEM 206. In some embodiments, the device and the SIM are combined to form the device-SIM kit in a device-SIM combination unit 307. In some embodiments, the SIM may be inserted into the device. In other embodiments, the SIM and the device are physically separated in the kit package.

The device-SIM combination unit 307 may be an internal component of the supply chain management system 300 or alternatively an external facility operated by a third-party vendor. In some embodiments, the A single SKU number is assigned to each one of the device-SIM kits of the inventory system 305. The single SKU number may be the original SKU of the device, the original SKU of the SIM, or a new SKU that can be used to identify the device-SIM kit.

The SKU management system 304 includes a device-SIM kit single SKU profile 314 corresponding to the device-SIM kit 312 of the device-SIM kit inventory 308. The device-SIM kit single SKU profile 314 includes a single SKU number and a single SKU location assigned to the device-SIM kit 312. The single SKU locations for each of the device-SIM kits may be stored in the VLM database 154. The device-kit kits can be delivered to end users 294 or retailers 296 in need thereof in business-to-business transactions or business-to-customer transactions, respectively. Similar to the supply chain management system 200, the supply chain management system 300 may be used to manage the device-SIM kit inventory and track the device-SIM kit in the entire life cycle thereof.

In some embodiments, the device-SIM kit 312 includes a device having an embedded SIM (eSIM) integrated into the device (sometimes also referred to as a "device-eSIM"). The eSIM embedded in the device may provide similar functions compared with a traditional SIM card, dispensing the need to have a separate physical SIM card in the kit. Accordingly, the SKU number assigned to the device-eSIM may be the original SKU number of the eSIM, or a new and differentiating SKU number. As such, the location of the device-eSIM may be similarly identifiable by a single SKU number assigned thereto, which makes it more convenient to track the device-eSIM and obtain a live status thereof through the single SKU number.

In some embodiments, the device-SIM kit 312 may include a device and both a SIM and an eSIM associated with the device (sometimes also referred to as a "device-SIM-eSIM kit"). Similar, a single SKU may be assigned to the device-SIM-eSIM kit for managing the device-SIM-eSIM kit in the inventory system 305, identifying the location of the device-SIM-eSIM kit, and tracking the device-SIM-eSIM kit before and after it leaves the inventory system 305 and during its entire life cycle.

The supply chain management system 300' of FIG. 3B is a close variation of the supply chain management system 300. In the illustrated example, the inventory system 305 further includes a device inventory 322 having at least one device without SIM 324. Different from the device-SIM kit 312, the device without SIM 324 is reserved for retailers or customers in exclusive need of a device (e.g., a retailer 298 that needs only device without SIM). A single SKU number is assigned to the device without SIM 324. Accordingly, a device single SKU profile 326 corresponding to the device without SIM 324 is generated and stored in the SKU management system 304. The device single SKU profile 326 includes the single SKU number assigned to the device without SIM 324 and the single SKU location of the device without SIM 324 in the inventory system 305.

Figure 4:
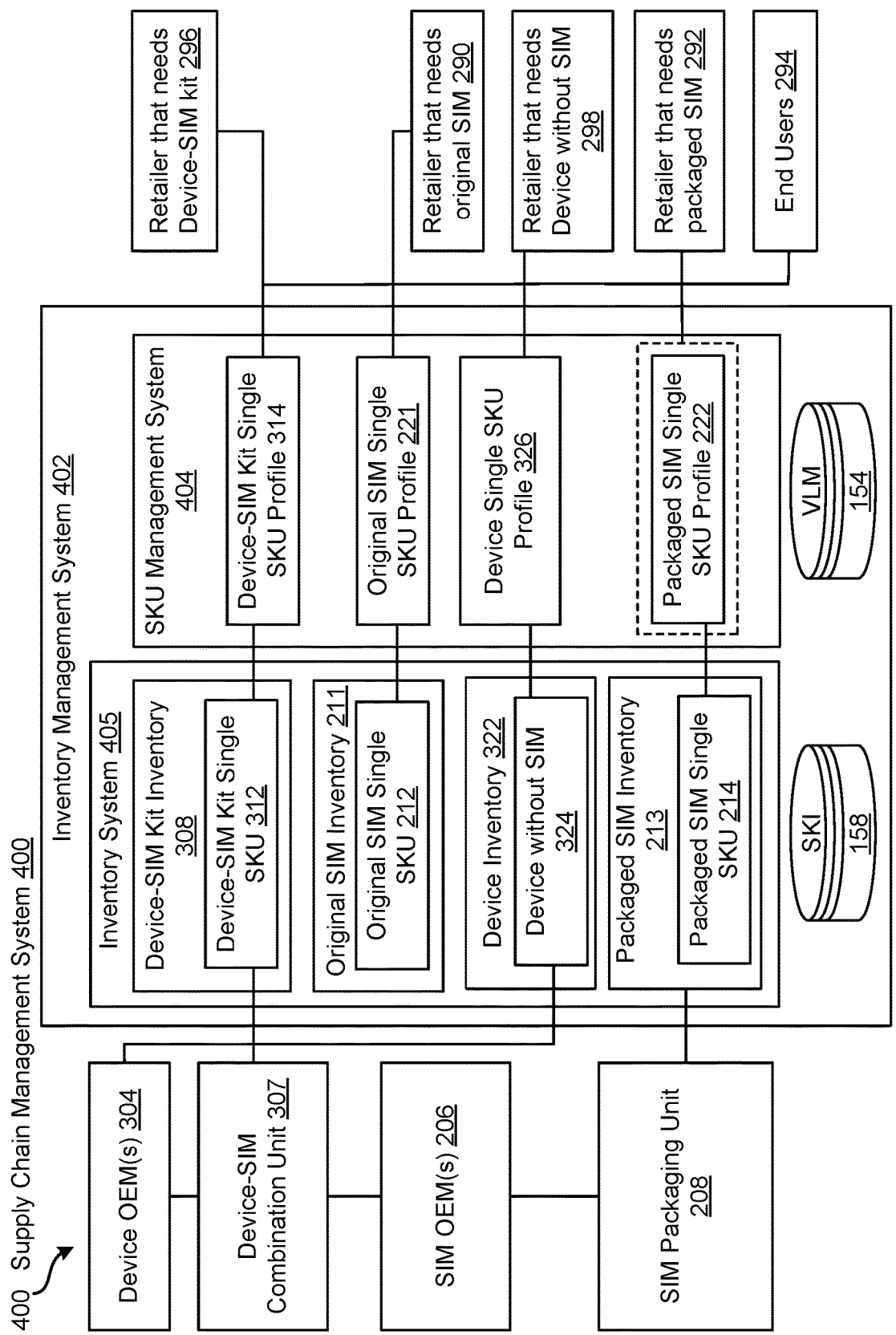
FIG. 4 is a schematic diagram illustrating a further example of a supply chain management system according to various embodiments.

FIG. 4 is a schematic diagram illustrating an exemplary supply chain management system 400 in accordance with another embodiment. The supply chain management system 400 is an integration of various components from the supply chain management systems 200, 300, and 300'. In the illustrated example, the supply chain management system 400 includes an inventory management system 402, optionally a SIM packaging unit 208, and optionally a device-SIM combination unit configured to generate a device-SIM kit 312. The inventory management system 402 includes an inventory system 405, a SKU management system 404, and various databases including a SKI database 158 and a VLM database 154. The inventory system 405 includes a device-SIM kit inventory 308, an original SIM inventory 211, a device inventory 322, and a packaged SIM inventory 213. The device-SIM kit inventory 308 includes at least one device-SIM kit 312 assigned with a single SKU; the original SIM inventory 211 includes at least one original SIM single SKU; the device inventory 322 includes at least one device without SIM; the packaged SIM inventory 213 includes at least one packaged SIM card 214 assigned with a single SKU. The SKU management system includes a device-SIM kit single SKU profile 314 corresponding to the device-SIM kit 312, an original SIM single SKU profile corresponding to the original SIM single SKU 212, a device single SKU profile 326 corresponding to the device without SIM 324, and a packaged SIM single SKU profile corresponding to the packaged SIM 214 card assigned with the single SKU. Details of these components have been described above and will not be repeated unless otherwise indicated.

Figure 5:
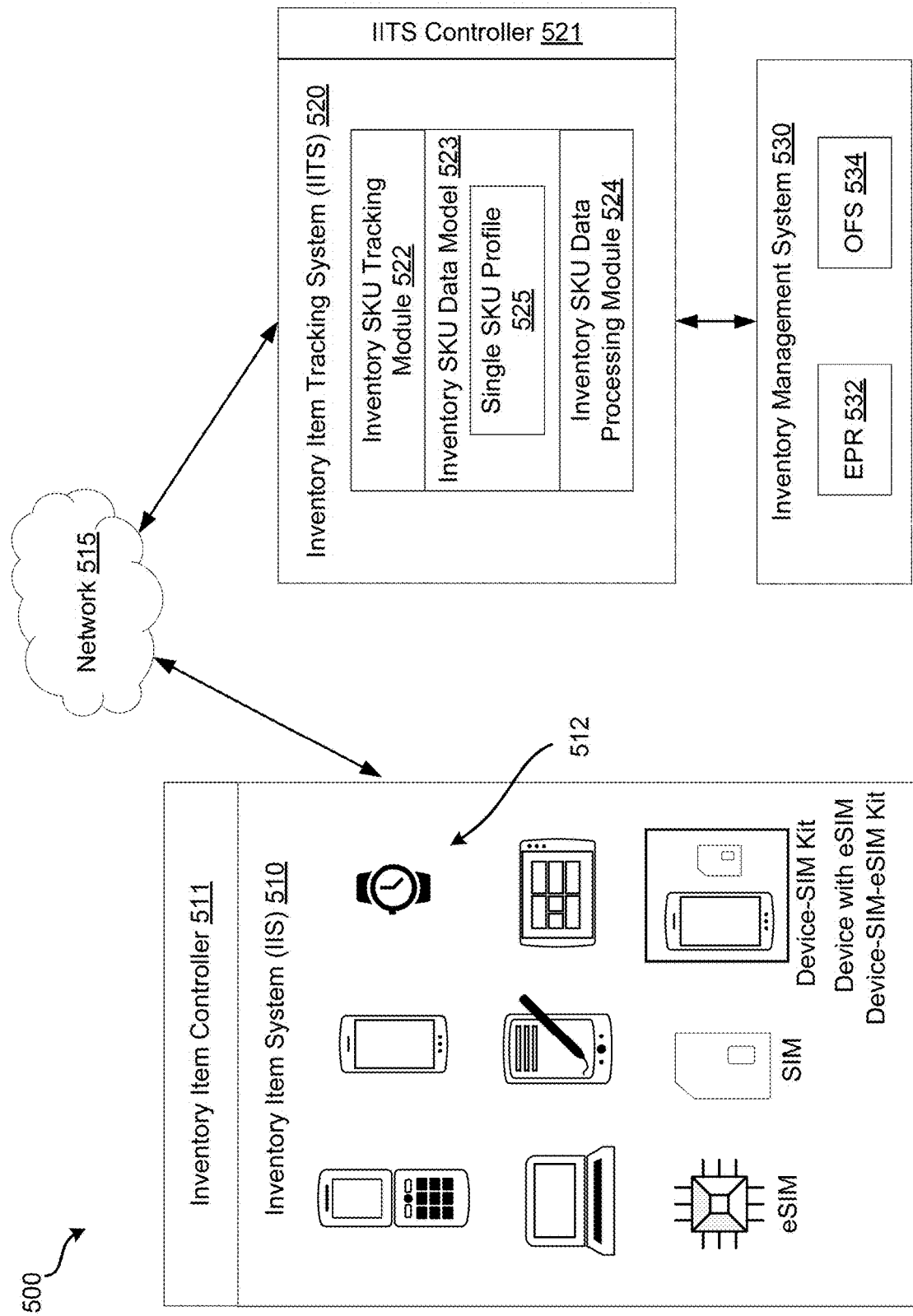
FIG. 5 is a schematic diagram illustrating an example of a communications system according to various embodiments.

FIG. 5 is a schematic diagram illustrating an exemplary communications system 500 for tracking an inventory item in accordance with another embodiment. It is noted that the communications system 500 may be a part of a supply chain management system described herein. Various components of the communications system 500 may be also included in the supply chain management system according to this disclosure. The communications system 500 is particularly useful in tracking an inventory item once it leaves the inventory or becomes owned and used by an end user.

In the illustrated example, the communications system 500 includes an inventory system 510 connected through a network 515 to an inventory item tracking system (IITS) 520. The inventory system 510 and the IITS 520 are configured to communicate and exchange information through the network 515. The IITS 520 may include and/or form part of an information delivery network, such as, for example, the Internet, the World Wide Web (Web), an online service provider, a private network, and/or any other analog or digital wired and/or wireless network that provides information.

The inventory system 510 may be an equivalent of the inventory system 205, 305, or 405 described above. The inventory system 510 may include an inventory item 512 having hardware and/or software components for communicating with the network 515 and the IITS 520. The inventory system 510 and IITS 520 each may include one or more computers systems and may be structured and arranged to communicate using various communication protocols to establish connections between network elements and/or to operate within or in concert with one or more other systems (e.g., the Internet and/or Web).

In some embodiments, the inventory system 510 and the IITS 520 each include one or more devices operating under the command of a controller (e.g., inventory item controller 511, and the IITS controller 521). The broken lines are intended to indicate that in some implementations, the controller, or portions thereof considered collectively, may instruct one or more elements of the systems to operate as described. Accordingly, the functions described herein may be implemented as software controlling one or more elements of the inventory system 510 and/or the IITS 520.

An example of a controller (e.g., the inventory item controller 511 or the IITS controller 521) is a program or software application installed on one or more devices. Other examples include codes, instruction sets, signals, or some combination thereof, for independently or collectively providing instructions. The controller may be implemented utilizing any suitable computer language and/or object-oriented techniques. The controller also may be embodied permanently or temporarily in any type of device, component, physical or virtual equipment, storage medium, or propagated signal capable of delivering instructions. In some embodiments, the controller (e.g., computer program, software application) may be stored on a storage medium (e.g., disk, device, propagated signal), such that if the storage medium is read by a computer system, the functions described herein are performed.

As mentioned above, the inventory item 512 may include a SIM (OEM SIM), a packaged SIM, a subscriber mobile device (OEM device without SIM), a kit having a subscriber mobile device and a SIM compatible with and operably connectable to the subscriber mobile device, a device with a pre-inserted SIM, a device-eSIM, a device-SIM-eSIM kit, etc. In some embodiments, the inventory item 512 is a subscriber mobile device, and the inventory item controller 511 includes a SIM compatible with and operably connected to the subscriber mobile device, or an eSIM embedded into or integrated with the subscriber mobile device, or both. In some embodiments, the inventory item 512 is a smartphone (e.g., a smartphone under the brand name of iPhone®, iPad®, and Samsung Galaxy®, etc.). The corresponding inventory item controller 511 includes at least one SIM or eSIM programmed to communicate a live status of the smartphone with the IITS controller 521. It is noted that the inventory item 512 is assigned with a single SKU number, according to which the inventory item 512 may be tracked.

As shown in FIG. 5, the IITS 520 includes, among other components, an inventory SKU tracking module 522, an inventory SKU data model 523, and an inventory SKU data processing module 524. It is noted that additional subsystems, modules, and databases may be included in the IITS 520 on demand. Typically, the components of the IITS 520 may employ a common database platform with business logic residing in the appropriate modules. In general, the modules may be implemented as hardware and/or software for performing the prescribed operations. It is to be understood that while certain components of the IITS 520 are shown as monolithic structures, each may include numerous elements (e.g., servers, routers, switches, firewalls, sockets, databases, tables, disks, hard drives, etc.) in various embodiments.

The inventory SKU tracking module 522 is configured to track a particular inventory item 512 according to the single SKU assigned to the particular inventory item. As mentioned above, the inventory item 512 may be a SIM card, a device without SIM, a device-SIM kit, or a device with embedded SIM, and each of the inventory items has a unique SKU assigned thereto for purpose of identification. The inventory SKU data model 523 may include a single SKU profile 525 corresponding to a particular inventory item 512. Examples of the single SKU profile include the original SIM single SKU profile 221, the packaged SIM single SKU profile 222, the device single SKU profile 326, or the device-SIM kit single SKU profile 314, according to the present disclosure. The single SKU profile 525 may contain multiple data fields (sometimes also referred to as "data entries" or "attributes"), each data field containing information regarding the corresponding inventory item 512. As mentioned above, the single SKU profile 525 may have a first data field containing the assigned SKU number and a second data field containing the location of the inventory item 512 in the inventory system 510.

In some embodiments, additional data fields may be included in the single SKU profile 525, and the additional data fields may include serialized information regarding the inventory item, such as an electronic serial number (ESN), an international mobile equipment identification (IMEI), a mobile identification number (MIN), an unlocking code for the handset, a subscriber information module (SIM) card code, an embedded SIM (eSIM) card code, a SIM card profile, an eSIM card profile, a universal integrated circuit card (UICC) code, an embedded UICC (eUICC) code, a UICC profile, an eUICC profile, a serial number of a finished handset assembly, a serial number of a basic component (e.g., speakers, microphones, keypads, displays, ringers, processors, chipsets, memories, displays, batteries) or an add-on component (e.g., communication devices, cameras, location technologies, multimedia players) of a finished handset.

In some embodiments, the single SKU profile 525 may further include information regarding a status of the inventory item in a supply chain, in a commercial transaction, and/or throughout the life cycle of the inventory item. For example, the status of a device may include an acquisition status, an inventory status, an order fulfillment status, a shipment status, a product registration status, an activation/deactivation status, a lock/unlock status, a return/exchange status, a lost/stolen/fraud status, a warranty status, an insurance enrollment status, an insurance replacement status, etc.

In some embodiments, the inventory SKU data model 523 may further include an SKU record of the inventory items. The SKU record may contain the SKU number of each inventory item, a physical location for each SKU, a quantity of each SKU at each location, replenishment data for each SKU, a minimum inventory level for each SKU at each location, a storage cost for each SKU at each location, and distribution data for each SKU in a database comprising a computer storage medium provided by a database server. The inventory SKU data model may be timely updated to reflect a change in the inventory status for each SKU.

In some embodiments, the inventory item 512 includes a device-SIM kit or a device-eSIM or a device-SIM-eSIM kit, and the single SKU profile 525 corresponding to the device-SIM kit or the device-eSIM or the device-SIM-eSIM kit includes a device document, a SIM/eSIM container document, and a SIM/eSIM profile document. The device document may include a product information profile and a device identity profile. The product information profile may contain the serialized product and manufacturer information of the device. In some embodiments, the product information profile includes multiple data fields, e.g., data field 1, data field 2, . . . , data field N. In some embodiments, the data fields of the product information profile include at least one of: a data field containing SKU information, which identifies various information about the device; a data field containing the type of document for the product information profile; a data field containing disposition code information about the current disposition of the device through its lifecycle; a data field containing additional information regarding the latest update to disposition code; a data field containing information regarding the brand of the device and legal values to be determined or enforced by upstream services; and a data field containing information regarding the person or entity who currently owns the device.

In some embodiments, the data fields of the product information profile may additionally include at least one of: a data field containing information regarding the most recent date/time on which the device was sold; a data field containing information regarding the most recent date/time on which the device was returned; name or code of the manufacturer of the device; a data field containing information regarding the date on which the device was manufactured (if known); a data field containing information regarding the original cost for the device when acquired; and a data field containing information regarding the current monetary value of the device. When the device-SIM kit or the device-eSIM is tracked, the information recorded in the data fields of the product information profile may be timely updated to reflect changes of the live status of the device.

The device identity profile may contain the serialized identity information of the device in relation to SIM/eSIM. In some embodiments, the device identity profile contains serialized information regarding the SIM/eSIM. In some embodiments, the device identity profile includes at least one of: a data field containing the manufacturer-assigned unique serial number for the device; a data field containing the manufacturer's part number for the device; a data field containing the IMEI number(s) assigned to the first radio chip installed in the device; a data field containing information about the SIM/eSIM type related to the IMEI number(s); a data field containing information about the current lock/unlock status of the device with respect to the SIM/eSIM associated with IMEI number(s).

In some embodiments, the device identity profile may further include at least one of: a data field containing a record of lock/unlock status of the device, which includes but is not limited to: information about the date on which the device is eligible to be unlocked with respect to each SIM and eSIM; a data field containing information about a future date to perform a temporary unlock (seasonal unlock) of the device with respect to each SIM and eSIM; a data field containing information about a future date to lock the device (closing a seasonal unlock window) with respect to each SIM and eSIM; a data field containing message(s) to convey any immediate error codes or success message feedback to the user of the device with respect to each SIM and eSIM; and a data field containing the network unlock PIN code (encrypted); and so on.

The SIM/eSIM container document contains information regarding the SIM and/or eSIM associated with the device identity profile (e.g., IEMI). In some embodiments, the SIM container document includes at least one of: a data field containing the Integrated Circuit Card Identifier (ICCID) number, which is the identifier of the UICC hardware; a data field containing the Embedded Integrated Circuit Card Identifier (EID) number, which is the identifier of the eUICC; a data field containing information regarding the installation status of the UICC (SIM); a data field containing information regarding the installation status of the eUICC and each eSIM associated therewith; a data field containing information regarding the manner the SIM can be triggered for changes (by network carrier or by the user); and/or a data field containing information regarding the manner the eSIM can be triggered for changes (by network carrier or by the user).

The SIM/eSIM profile document includes a SIM/eSIM profile containing various data fields describing a live status the SIM/eSIM. In some embodiments, the SIM/eSIM profile document includes at least one of: a data field containing information regarding the profile type (e.g., identity of the profile by carrier, SIM/eSIM vendor providing the profile, version of the profile, etc.); a data field containing information regarding the state of the profile (e.g., whether the profile is allocated, linked, downloaded, and installed); a data field containing information regarding the first Personal Identification Number (PIN) assigned to the SIM/eSIM; a data field containing information regarding the second Personal Identification Number (PIN) assigned to the SIM/eSIM, if any; a data field containing a status of the first and/or second PIN; information regarding the International Mobile Subscriber Identity (IMSI) assigned to the user of the device; and a data field containing information regarding the unique identifier (id) for the SIM/eSIM container that this profile is loaded into. It should be understood that other information related to the SIM/eSIM may also be included in the SIM profile document.

The inventory SKU data processing module 524 is configured to process and analyze information received by the IITS controller 521, determine a live status or a change thereof regarding the tracked inventory item, and update the inventory SKU data model 523 or the single SKU profile 525 stored therein. For example, once a change of status (e.g., an event change) is detected and determined, the single SKU profile 525 may be updated with additional data field(s) containing information that reflects the change of status.

In some embodiments, the IITS 520 is operably connected to an inventory management system 530. The inventory management system 530 is an equivalent of the inventory management system 202, 302, or 402 described herein. Information and data received and processed by the IITS 520 regarding the tracked inventory item 512 may be communicated with the inventory management system 530, e.g., to update the SKI database 158 and the VLM database 154. In addition, the IITS 520 may track the movement and status of the inventory item 512 and communicate information to manufacturers, distributors, carriers, customers, operations, and other company areas and partners.

In some embodiments, the inventory management system 530 may further include a resource planning system (EPR) 532 and an order fulfillment system (OFS) 534 that are operably connected to the SIMS 220. The resource planning system 532 may be configured to cover inventory quantity and cost information, while maintaining serialized information of the tracked inventory item 512. The order fulfillment system 534 may be configured to incorporate rules and manage the operational steps of order fulfillment.

Figures 6A, 6B:
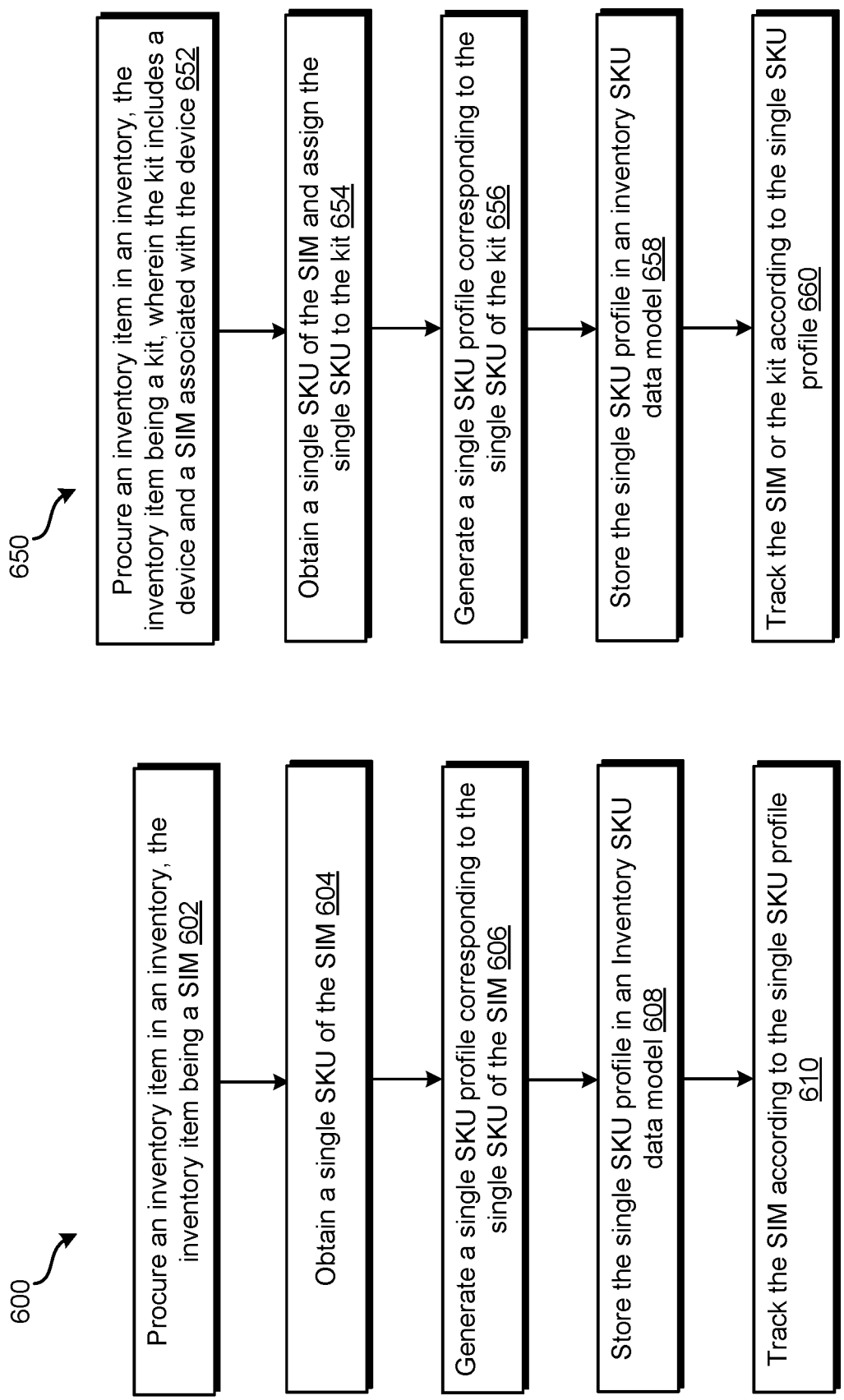
FIG. 6A is a flowchart diagram illustrating an example method according to various embodiments.
FIG. 6B is a flowchart diagram illustrating another example method according to various embodiments.

FIGS. 6A and 6B are flowchart diagrams illustrating two example methods 600 and 650 according to various embodiments. The methods 600 and 650 may be used for managing a supply chain, managing an inventory containing inventory items, and/or tracking an inventory item of an inventory. In the illustrated example of FIG. 6A, the method 600 includes operations 602, 604, 606, 608, and 610. Additional operations may be performed. Also, it should be understood that the sequence of the various operations discussed above with references to FIGS. 6A and 6B is provided for illustrative purposes, and as such, other embodiments may utilize different sequences.

At operation 602, an inventory item (e.g., a SIM) is procured and designated to a place in an inventory. In some embodiments, the SIM is obtained from a SIM OEM. In other embodiments, the SIM is packaged using a SIM packaging unit. At operation 604, a single SKU is obtained and assigned to the SIM of the inventory. At operation 606, a single SKU profile corresponding to the SIM is generated. The single SKU profile includes at least one of: the assigned single SKU number, information regarding the location of the SIM in the inventory, a SIM container document, and a SIM profile document. At operation 608, the single SKU profile is stored in an inventory SKU data model. At operation 610, the SIM is tracked according to the single SKU number to determine a live status or an event change thereof. The single SKU profile may be updated with the event change regarding the SIM.

In the illustrated example of FIG. 6B, the method 650 includes operations 652, 654, 656, 658, and 660. At operation 652, an inventory item is procured and designated to a place in an inventory, wherein the inventory item is a kit comprising a device and a SIM associated with the device. The SIM may include a physical SIM card, an embedded SIM that is integrated with the device, or both. The kit may be generated in a device-SIM combination unit, wherein the device and the kit are assembled and placed in a kit package. In some embodiments, the kit is in a form of a device having an eSIM embedded therein (device-eSIM). In some embodiments, the kit includes a device having an eSIM embedded therein and a SIM compatible with and operably connectable to the device.

At operation 654, a single SKU number is obtained and assigned to the kit. In some embodiments, the single SKU is obtained from the original OEM of the device, the original OEM of the SIM, or a new SKU generated in an inventory management system. At operation 656, a single SKU profile corresponding to the kit is generated. The single SKU profile includes at least one of: the assigned single SKU number to the kit, information regarding the location of the kit in the inventory, a device document, a SIM/eSIM container document, and a SIM/eSIM profile document. At operation 658, the single SKU profile is stored in an inventory SKU data model. At operation 660, the SIM/eSIM is tracked according to the single SKU number to determine a live status or an event change thereof. The single SKU profile may be updated with the event change regarding the device and the SIM/eSIM.

Figure 7:
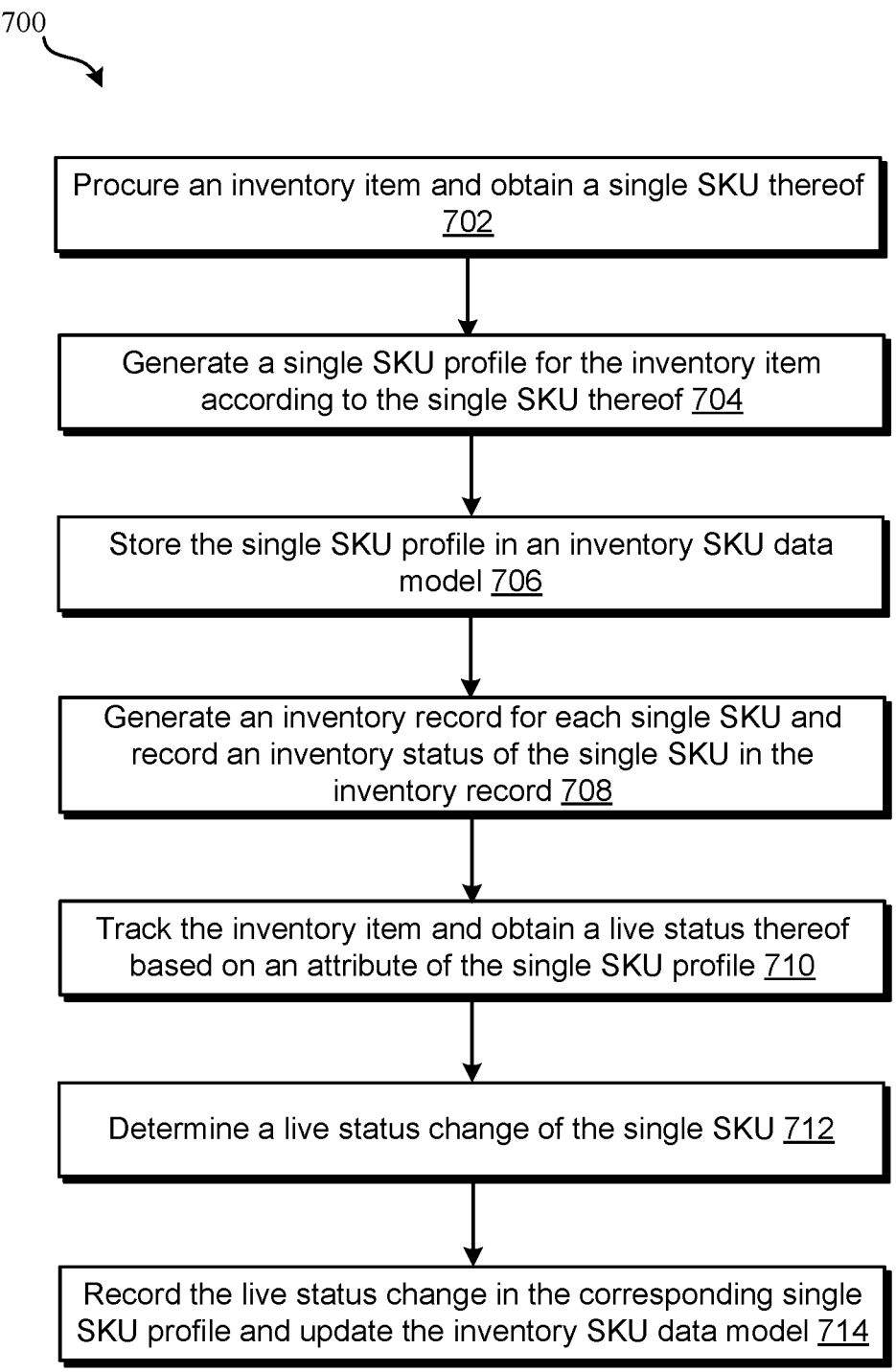
FIG. 7 is a flowchart diagram illustrating yet another example method according to various embodiments.

FIG. 7 is a flowchart diagram illustrating an example method 700 according to various embodiments. In the illustrated example, the method 700 includes operations 702, 704, 706, 708, 710, 712, and 714. At operation 702, an inventory item is received, and a single SKU is obtained and assigned to the inventory item. At operation 704, a single SKU profile for the inventory item is generated according to the single SKU thereof. At operation 706, the single SKU profile is stored in an inventory SKU data model of an inventory management system. At operation 708, an inventory record for each single SKU is generated, and an inventory status and/or a change thereof for each single SKU are recorded in the inventory record. At operation 710, the inventory item is tracked, and a live status thereof is obtained based on an attribute of the inventory item from the single SKU profile. At operation 712, a live status or an event change regarding the inventory item is determined based on communication between the inventory management system with the inventory item according to the single SKU thereof. At operation 714, the live status change or event change of the inventory item according to the single SKU thereof is recorded in the single SKU profile of the inventory item, and the inventory SKU data model is updated to reflect any inventory status change of the inventory item caused by the live status change.

Figure 8:
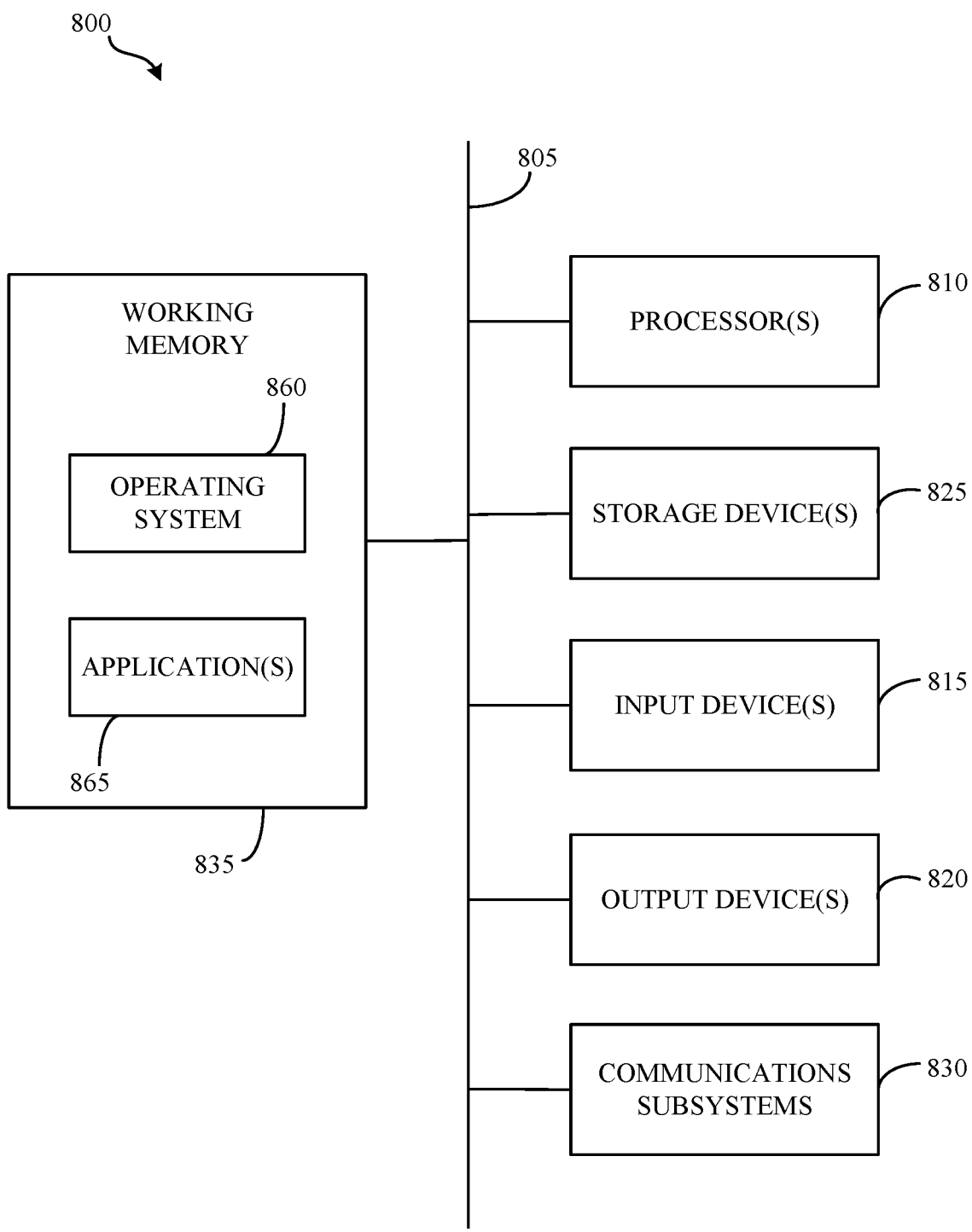
FIG. 8 is a schematic diagram illustrating an example of a computer system according to various embodiments.

FIG. 8 is a schematic diagram illustrating an example of computer system 800. The computer system 800 is a simplified computer system that can be used implement various embodiments described and illustrated herein.

A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g., the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 860, device drivers, executable libraries, and/or other code, such as one or more application programs 865, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 860 and/or other code, such as an application program 865, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for tracking an inventory item, the method being implemented by a computer system, and comprising:
    obtaining a single SKU and assigning the single SKU to an inventory item of an inventory, wherein the inventory item comprises a subscriber identity module (SIM), the SIM is compatible with and operably connectable with a subscriber mobile device;
    generating a single SKU profile for the inventory item according to the single SKU and storing the single SKU profile in an inventory SKU data model, the single SKU profile including a number of the single SKU and an inventory location of the single SKU;
    generating an inventory record according to the single SKU and storing the inventory record in the inventory SKU data model;
    identifying the inventory item according to the number and location of the single SKU, based on an instruction for order fulfillment; and
    tracking, after the inventory item leaves the inventory, the inventory item according to the single SKU through wireless communication between the computer system and the SIM to determine an inventory status change of the inventory item and recording the inventory status change in the inventory record.

2. The method according to claim 1, further comprising:
    tracking the inventory item according to the single SKU to obtain a live status thereof based on an attribute of the single SKU profile;
    determining a live status change of the inventory item according to the single SKU and;
    recording the live status change of the inventory item in the single SKU profile.

3. The method according to claim 1, wherein the single SKU profile further comprises a SIM container document and a SIM profile document.

4. The method according to claim 1,
    wherein the inventory item further comprises the subscriber mobile device; and
    wherein the single SKU profile further comprises:
        a device document containing product information of the subscriber mobile device;
        a SIM container document containing product information of the SIM; and
        a SIM profile document containing at least one attribute of the SIM.

5. The method according to claim 4, wherein the SIM includes an embedded SIM (eSIM) integrated to the subscriber mobile device.

6. The method according to claim 2, wherein the live status of the inventory item includes at least one of: an acquisition status, a procurement status, an order fulfillment status, a shipment status, a product registration status, an activation/deactivation status, a lock/unlock status, a return/exchange status, a lost/stolen/fraud status, a warranty status, an insurance enrollment status, an insurance replacement status.

7. The method according to claim 1, wherein the inventory record further includes information regarding a quantity of each single SKU at each inventory location, replenishment data for each single SKU, a minimum inventory level for each single SKU at each inventory location, a storage cost for each single SKU at each inventory location, and distribution data for each single SKU.

8. A computerized system for inventory management, the computerized system comprising:
one or more electronic processors;
a machine-readable storage medium in electronic communication with the one or more electronic processors; and
instructions stored in the machine-readable storage medium and executable by the one or more electronic processors to cause the system to:
obtain a single SKU and assign the single SKU to an inventory item of an inventory, wherein the inventory item comprises a subscriber identity module (SIM), the SIM is compatible with and operably connectable with a subscriber mobile device;
generate a single SKU profile for the inventory item according to the single SKU and storing the single SKU profile in an inventory SKU data model, the single SKU profile including a number of the single SKU and an inventory location of the single SKU;
generate an inventory record according to the single SKU and storing the inventory record in the inventory SKU data model;
identify the inventory item according to the number and location of the single SKU, based on an instruction for order fulfillment; and
track, after the inventory item leaves the inventory, the inventory item according to the single SKU through wireless communication between the computerized system and the SIM to determine an inventory status change of the inventory item and record the inventory status change in the inventory record.

9. The computerized system according to claim 8, wherein the one or more processors are further instructed to cause the system to:
track the inventory item according to the single SKU to obtain a live status thereof based on an attribute of the single SKU profile;
determine a live status change of the inventory item according to the single SKU and;
record the live status change of the inventory item in the single SKU profile.

10. The computerized system according to claim 8, wherein the single SKU profile further comprises a SIM container document and a SIM profile document.

11. The computerized system according to claim 8,
wherein the inventory item further comprises the subscriber mobile device; and
wherein the single SKU profile further comprises:
a device document containing product information of the subscriber mobile device;
a SIM container document containing product information of the SIM; and
a SIM profile document containing at least one attribute of the SIM.

12. The computerized system according to claim 11, wherein the SIM includes an embedded SIM (eSIM) integrated to the subscriber mobile device.

13. The computerized system according to claim 9, wherein the live status of the inventory item includes at least one of: an acquisition status, a procurement status, an order fulfillment status, a shipment status, a product registration status, an activation/deactivation status, a lock/unlock status, a return/exchange status, a lost/stolen/fraud status, a warranty status, an insurance enrollment status, an insurance replacement status.

14. The computerized system according to claim 8, wherein the inventory record further includes information regarding a quantity of each single SKU at each inventory location, replenishment data for each single SKU, a minimum inventory level for each single SKU at each inventory location, a storage cost for each single SKU at each inventory location, and distribution data for each single SKU.

15. A non-transitory machine-readable storage medium encoded with instructions, the instructions executable to cause one or more processors of a computerized inventory management system to perform one or more operations of a method, the method comprising:
obtaining a single SKU and assigning the single SKU to an inventory item of an inventory, wherein the inventory item comprises a subscriber identity module (SIM), the SIM is compatible with and operably connectable with a subscriber mobile device;
generating a single SKU profile for the inventory item according to the single SKU and storing the single SKU profile in an inventory SKU data model, the single SKU profile including a number of the single SKU and an inventory location of the single SKU;
generating an inventory record according to the single SKU and storing the inventory record in the inventory SKU data model;
identifying the inventory item according to the number and location of the single SKU, based on an instruction for order fulfillment; and
tracking, after the inventory item leaves the inventory, the inventory item according to the single SKU through wireless communication between the computerized inventory management system and the SIM to determine an inventory status change of the inventory item and recording the inventory status change in the inventory record.

16. The non-transitory machine-readable storage medium according to claim 15, wherein the method further comprises:
tracking the inventory item according to the single SKU to obtain a live status thereof based on an attribute of the single SKU profile;
determining a live status change of the inventory item according to the single SKU and;
recording the live status change of the inventory item in the single SKU profile.

17. The non-transitory machine-readable storage medium according to claim 15, wherein the single SKU profile further comprises a SIM container document and a SIM profile document.

18. The non-transitory machine-readable storage medium according to claim 15,
wherein the inventory item further comprises the subscriber mobile device; and wherein the single SKU profile further comprises:
- a device document containing product information of the subscriber mobile device;
- a SIM container document containing product information of the SIM; and
- a SIM profile document containing at least one attribute of the SIM.

19. The non-transitory machine-readable storage medium according to claim 18, wherein the SIM includes an embedded SIM (eSIM) integrated to the subscriber mobile device.

20. The non-transitory machine-readable storage medium according to claim 15, wherein the live status of the inventory item includes at least one of: an acquisition status, a procurement status, an order fulfillment status, a shipment status, a product registration status, an activation/deactivation status, a lock/unlock status, a return/exchange status, a lost/stolen/fraud status, a warranty status, an insurance enrollment status, an insurance replacement status.

* * * * *